United States Patent
Lee et al.

(10) Patent No.: US 8,379,104 B2
(45) Date of Patent: Feb. 19, 2013

(54) CAMERA DEVICE AND METHOD FOR CAPTURING NON-BLINKING IMAGES OF PEOPLE

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/275,324

(22) Filed: Oct. 18, 2011

(65) Prior Publication Data

US 2012/0194694 A1 Aug. 2, 2012

(30) Foreign Application Priority Data

Jan. 27, 2011 (TW) ................................ 00102986 A

(51) Int. Cl.
*H04N 5/228* (2006.01)

(52) U.S. Cl. ..................... 348/222.1; 382/190; 382/192; 382/209; 382/254

(58) Field of Classification Search ............... 348/222.1; 382/192–194, 209, 254, 275
See application file for complete search history.

(56) References Cited

U.S. PATENT DOCUMENTS

| | | | |
|---|---|---|---|
| 6,256,400 B1* | 7/2001 | Takata et al. | 382/103 |
| 8,254,691 B2* | 8/2012 | Kaneda et al. | 382/195 |
| 2005/0200736 A1* | 9/2005 | Ito | 348/333.01 |
| 2007/0122034 A1* | 5/2007 | Maor | 382/181 |
| 2010/0129048 A1* | 5/2010 | Pitts et al. | 386/52 |
| 2010/0189358 A1* | 7/2010 | Kaneda et al. | 382/195 |
| 2010/0245614 A1* | 9/2010 | Matsunaga | 348/222.1 |
| 2011/0205383 A1* | 8/2011 | Shah | 348/222.1 |

FOREIGN PATENT DOCUMENTS

KR 201000069028 * 6/2010

* cited by examiner

*Primary Examiner* — Sinh Tran
*Assistant Examiner* — Paul Berardesca
(74) *Attorney, Agent, or Firm* — Altis Law Group, Inc.

(57) ABSTRACT

In a method for capturing non-blinking images of people using a camera device, the camera device includes an image capturing unit and a storage system. The image capturing unit captures a series of digital images of a group of persons. A face feature value and an eyes feature value of people are predefined, and are stored in the storage system. The number of faces is detected from each of the digital images according to the face feature value, and the number of eyeballs is detected from each of the face area according to the eyes feature value. The method calculates the ratio of the number of faces and the number of eyeballs, and selects the digital image of which the ratio of the face number and the eyeball number is 1:2 as a non-blinking image of the a group of persons.

13 Claims, 4 Drawing Sheets

CAMERA DEVICE AND METHOD FOR CAPTURING NON-BLINKING IMAGES OF PEOPLE

BACKGROUND

1. Technical Field

The embodiments of the present disclosure relate to image capturing devices and methods, and more particularly to a camera device and method for capturing non-blinking images of people having no closed eyes.

2. Description of Related Art

People use camera devices to take digital images of one or more persons. Often, however, one of the subjects of the image may have his or her eyes closed as the shutter of the camera device is pressed, and the image is captured just as the subject is blinking his or her eyes. Thus, the digital images captured from the person may show his or her eyes were closed. Having one or more people in a digital image with their eyes closed makes for an unappealing image. Therefore, it is desirable to have a camera device and method for capturing non-blinking images of one or more persons having no closed eyes, so as to improve the image quality of the digital images.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
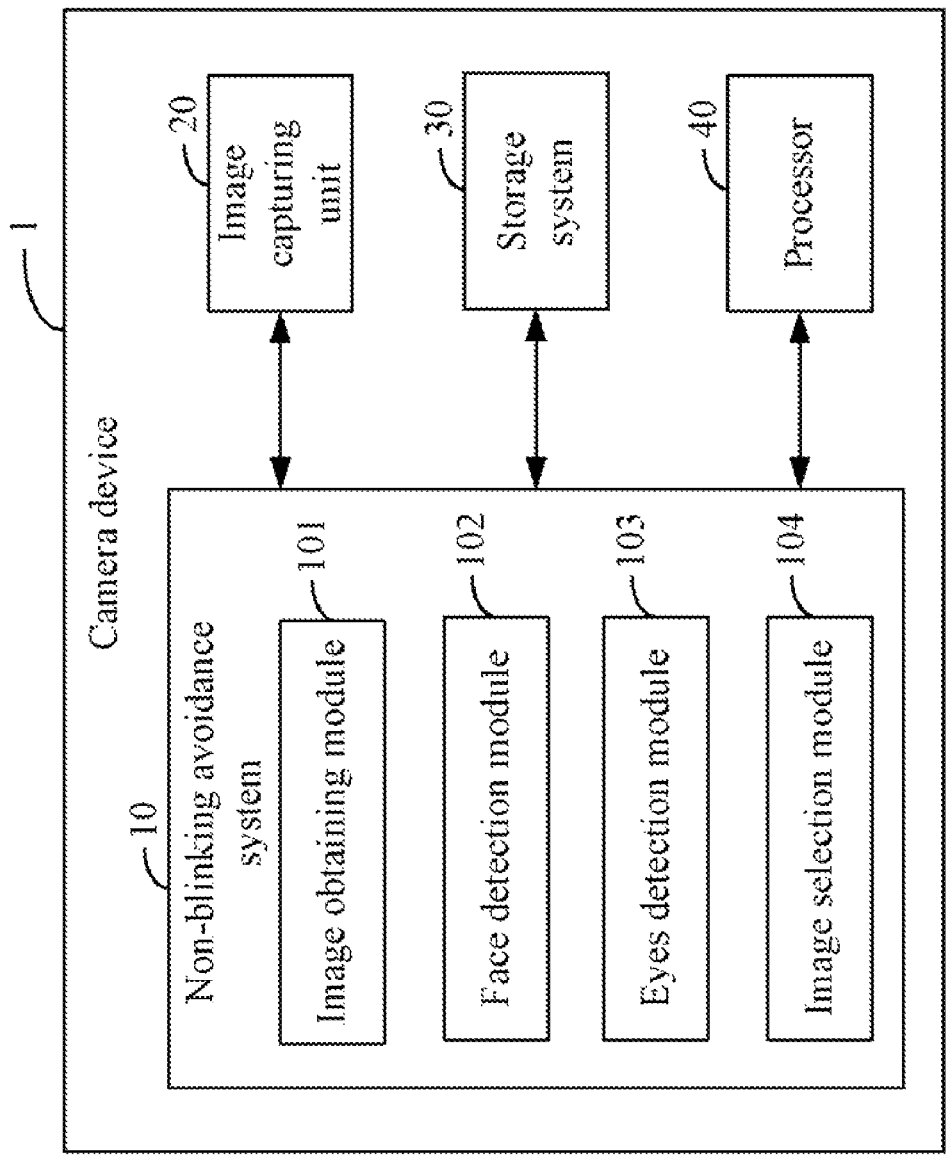
FIG. 1 is a block diagram of one embodiment of a camera device including a non-blinking avoidance system.

FIG. 1 is a block diagram of one embodiment of a camera device 1 including a non-blinking avoidance system 10. In the embodiment, the non-blinking avoidance system 10 may include a plurality of functional modules that are implemented by the camera device 1 to capture one or more images of people who have no closed eyes. The camera device 1 may be a video camera, a digital camera, or other image capturing device having a digital camera functionality. The camera device 1 may further includes an image capturing unit 20, a storage system 30, and at least one processor 40. It is understood that FIG. 1 is only one example of a camera device 1, such a camera can include more or fewer components than those shown in the embodiment, or have a different configuration of the various components.

The image capturing unit 20 is configured to capture a series of digital images of a group of persons, and to store the digital images into the storage system 30. In one embodiment, the storage system 30 may be an internal storage system, such as a random access memory (RAM) for the temporary storage of information, and/or a read only memory (ROM) for the permanent storage of information. In some embodiments, the storage system 30 may also be an external storage system, such as an external hard disk, a storage card, or a data storage medium.

In one embodiment, the non-blinking avoidance system 10 includes an image obtaining module 101, a face detection module 102, an eyes detection module 103, and an image selection module 104. The modules 101-103 may comprise computerized instructions in the form of one or more programs that are stored in the storage system 30 and executed by the processor 40 to provide functions for implementing the modules. In general, the word "module," as used herein, refers to logic embodied in hardware or firmware, or to a collection of software instructions, written in a programming language. In one embodiment, the program language may be Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, flash memory, and hard disk drives. A detailed descriptions of each modules will be given.

The image obtaining module 101 is operable to predefine a face feature value and an eyes feature value of people, and to store the face feature value and the eyes feature value into the storage system 30. In one embodiment, the face feature value may be a face similarity coefficient (e.g., a 95% similarity) that represents the part of a digital image which is the face or most closely resembles the face of the people, and the eyes feature value may be an eyes similarity coefficient (e.g., a 90% similarity) that represents the part of a digital image which does contain or is most likely to contain the eyes of the people.

Figure 2:
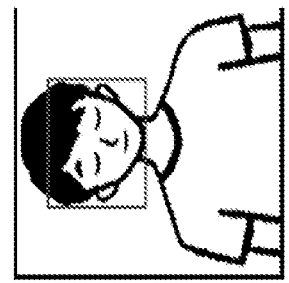
FIG. 2 is a schematic diagram illustrating an example of detecting face areas in digital images of people captured by the camera device.
Figure 2:
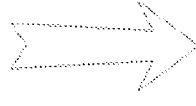
Figure 2:
Figure 2:
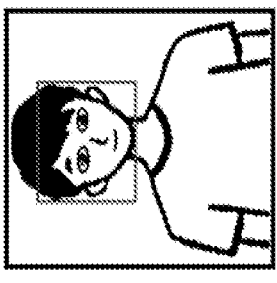
Figure 2:
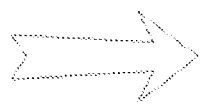
Figure 2:
Figure 2:
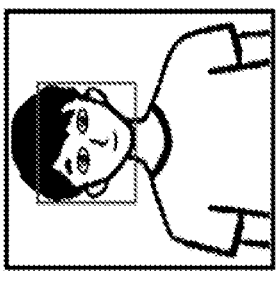
Figure 2:
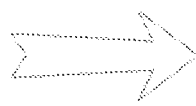
Figure 2:
Figure 2:
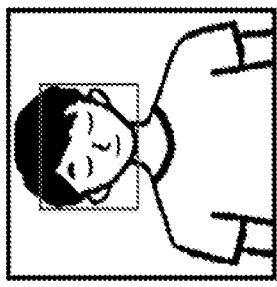
Figure 2:
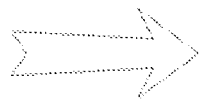
Figure 2:

The image obtaining module 101 is further operable to control the image capturing unit 20 to capture a series of digital images of the group of persons. In one embodiment, the image capturing unit 20 captures four simultaneous images of the peoples at almost the same instant in time, such as the digital images 1-4 as shown in FIG. 2.

The face detection module 102 is operable to detect one or more face areas from each of the digital images according to the face feature value, to analyze an image resolution of each of the face areas, and to count a number of faces in the face areas in each of the digital images. In one embodiment, if a face similarity coefficient between an image area of the digital image and a predefined face sample stored in the storage system 30 is greater than the face feature value, the face detection module 102 detects and deems that particular area(s) in the digital image as the face area of the people in the digital image. Referring to FIG. 2, the face detection module 102 may detect four face areas from the digital images, and counts the number of faces in the face areas in each of the digital images, for example, face number=1 as shown in FIG. 2. In one embodiment, the image resolution of a face area can reflect the image quality of the face area. If the image resolution is higher, the face area has a good image quality. Otherwise, if the image resolution is lower, the face area does not have a good image quality.

Figure 3:
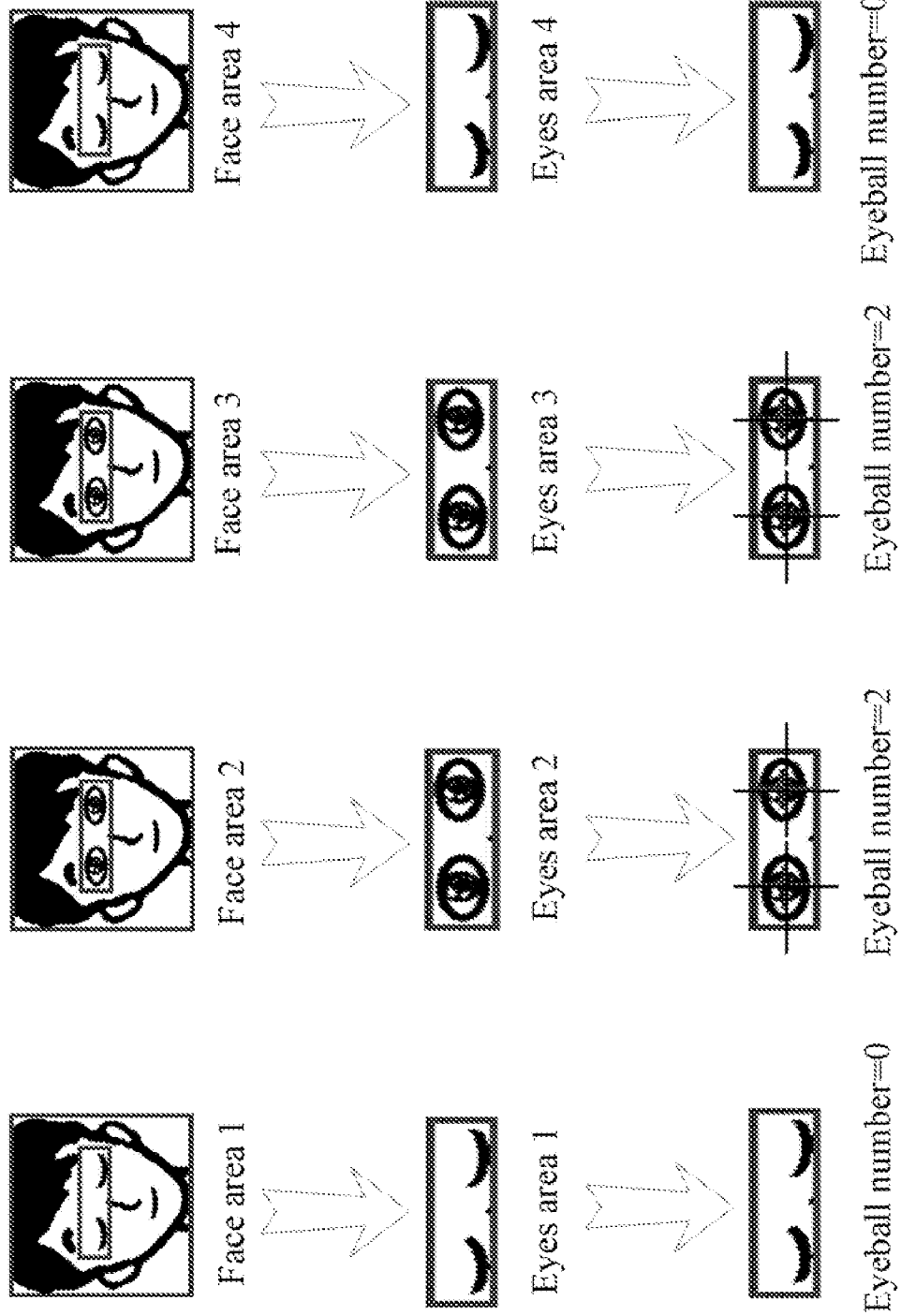
FIG. 3 is a schematic diagram illustrating an example of detecting eyeball areas in each of the face areas.

The eyes detection module 103 is operable to detect an area of the eyes (hereafter "the eyes area") from each of the face areas according to the eyes feature value, to analyze an image resolution of each of the eyes areas, and to count a number of eyeballs in the eyes areas in each of the digital images. In one embodiment, if an eyes similarity coefficient between a particular image area of the digital image and a predefined eyes sample stored in the storage system 30 is greater than the eyes feature value, the face detection module 102 detects and deems that the image area is an eyes area of the digital image. The eyes detection module 103 can analyze the color in each of the deemed eyes areas to seek images of black and round objects as denoting the eyeball area, and to compare the deemed eyeball area with a predefined eyeball sample stored in the storage system 30 to count the number of eyeballs in each of the eyes areas in each of the digital images. As shown in FIG. 3, each of the face areas 1 and 4 have no eyeball showing since the eyes are closed, and each of the face areas 2-3 has two eyeballs showing, since the eyes are open.

The image selection module 104 is operable to calculate a ratio of the number of faces and the number of eyeballs in each of the digital images, and select the digital images whose ratio of the number of faces and the number of eyeballs is 1:2 as target images. In one embodiment, if a person has his/her eyes open, the number of eyeballs of the digital image is equal to two. If the person has one or both of his/her eyes closed, the number of eyeballs of the digital image is less than two. Referring to FIG. 3, the image selection module 104 selects the digital images 2-3 as two target images, each of the digital images 2-3 whose ratio of the number of faces and the number of eyeballs is 1:2.

The image selection module 104 is further operable to determine whether a total number of the target images is more than one. If the total number of the target images is equal to one, the image selection module 104 determines the target image as an image that does not contain any person that is blinking (hereinafter "a non-blinking image"). If the total number of the target images is more than one, the image selection module 104 selects one of the target images in which the face area and the eyes area with the highest image resolution as the non-blinking image.

Figure 4:
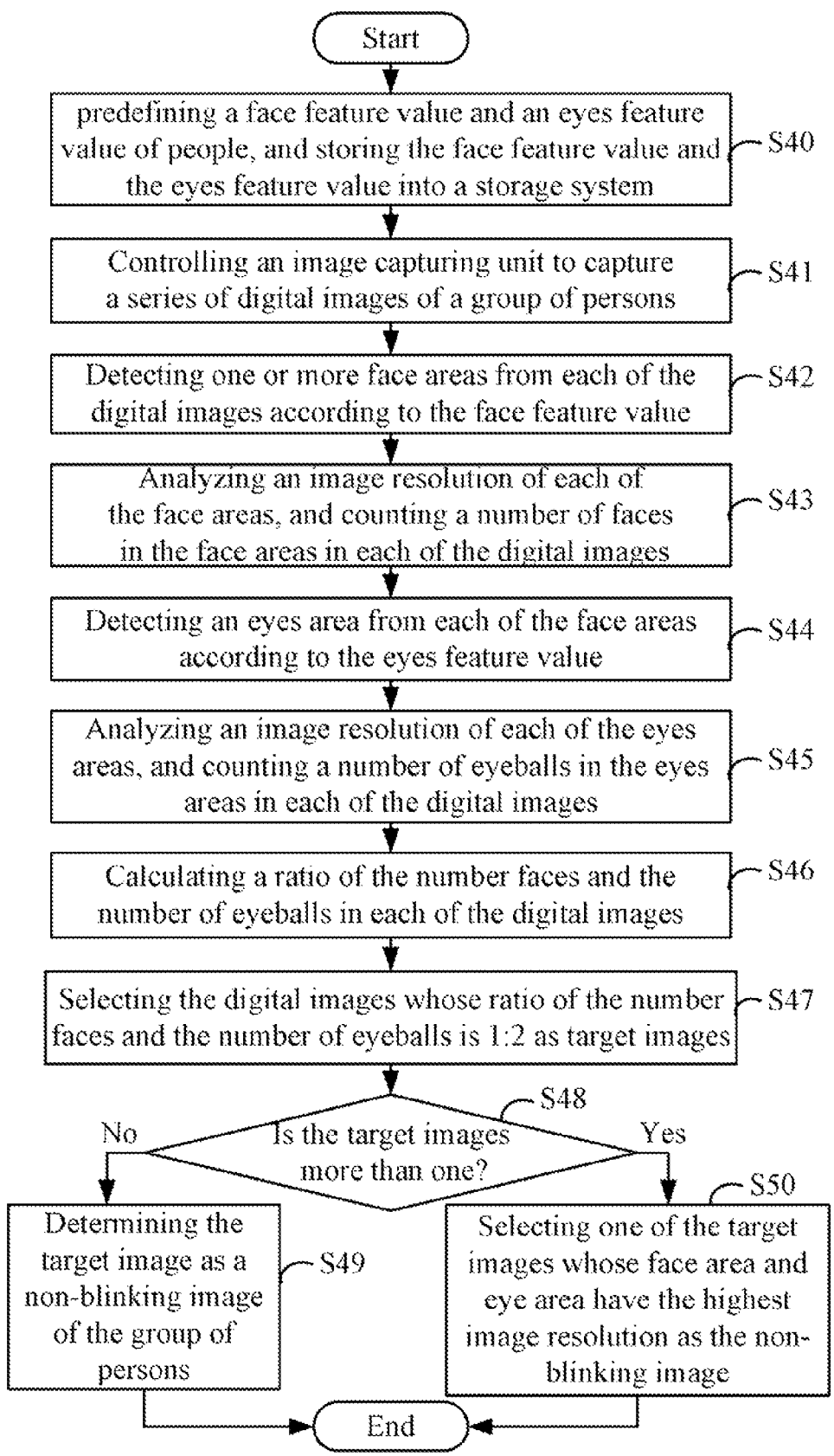
FIG. 4 is a flowchart of one embodiment of a method for capturing a non-blinking image of people using the camera device of FIG. 1.

FIG. 4 is a flowchart of one embodiment of a method for capturing a non-blinking image of people using the camera device 1 of FIG. 1. Depending on the embodiment, additional blocks may be added, others removed, and the ordering of the blocks may be changed.

In block S40, the image obtaining module 101 predefines a face feature value and an eyes feature value of people, and stores the face feature value and the eyes feature value into the storage system 30. In one embodiment, the face feature value may be a face similarity coefficient (e.g., a 95% similarity) that represents the part of a digital image which is the face or most closely resembles the face of the people, and the eyes feature value may be an eyes similarity coefficient (e.g., a 90% similarity) that represents the part of a digital image which does contain or is most likely to contain the eyes of the people.

In block S41, the image obtaining module 101 controls the image capturing unit 20 to capture a series of digital images of a group of persons. In one embodiment, the image capturing unit 20 captures four images from the group of peoples at almost the same instant of time, such as the digital images 1-4 as shown in FIG. 2.

In block S42, the face detection module 102 detects one or more face area from each of the digital images according to the face feature value. In one embodiment, if the face similarity coefficient between a particular image area of the digital image and a predefined face sample is greater than the face feature value, the face detection module 102 detects and deems the particular image area as the face area of the digital image. Referring to FIG. 2, the face detection module 102 detects four facial areas from the digital images, and counts the number of faces in each of the digital images.

In block S43, the face detection module 102 analyzes an image resolution of each of the face areas, and counts the number of faces in the face areas in each of the digital images. In one embodiment, the image resolution of a face area can reflect the image quality of the face area. If the image resolution is higher, the face area has a good image quality and is thus easily recognized as a face. Otherwise, if the image resolution is lower, the face area does not have a good image quality. Referring to FIG. 2, the face detection module 102 may detect four face areas from the digital images, and counts the number of faces in the face areas in each of the digital images, for example, face number=1 as shown in FIG. 2.

In block S44, the eyes detection module 103 detects an eyes area from each of the face areas according to the eyes feature value. In one embodiment, if an eyes similarity coefficient between a particular image area of the digital image and a predefined eyes sample is greater than the eyes feature value, the face detection module 102 detects and deems the particular area of the digital image as the eyes area of the people.

In block S45, the eyes detection module 103 analyzes an image resolution of each of the eyes areas, and counts the number of eyeballs in the eyes areas in each of the digital images. In the embodiment, the eyes detection module 103 may analyze the colors in each of the eyes areas to seek images of black and round objects as denoting the eyeball area, and compares the apparent eyeball area with a predefined eyeball samples stored in the storage system 30 to count the number of eyeballs in the eyes areas in each of the digital images. As shown in FIG. 3, each of the face area 1 and 4 have no eyeballs since the eyes are closed, and each of the face areas 2-3 has two eyeballs since the eyes are open.

In block S46, the image selection module 104 calculates a ratio of the number of faces and the number of eyeballs in each of the digital images. In one embodiment, if a person has open eyes, the ratio between the number of faces and the number of eyeballs is 1:2. If the person has one or both of his/her eyes closed, the ratio between the number of faces and the number of eyeballs may be only 1:1 or 1:0.

In block S47, the image selection module 104 selects the digital images whose ratio of the number of faces and the number of eyeballs is 1:2 as target images. Referring to FIG. 3, the image selection module 104 selects the digital images 2-3 as two target images, each of the digital images 2-3 whose ratio of the number of faces and the number of eyeballs is 1:2.

In block S48, the image selection module 104 determines whether a total number of the target images is more than one. If the total number of the target images is equal to one, in block S49, the image selection module 104 determines the target image as a non-blinking image of the group of persons. Otherwise, if the total number of the target images is more than one, in block S50, the image selection module 104 selects one of the target images in which the face area and the eyes area with the highest image resolution as the non-blinking image.

All of the processes described above may be embodied in, and fully automated via, functional code modules executed by one or more general purpose processors of the electronic devices. The code modules may be stored in any type of non-transitory readable medium or other storage device. Some or all of the methods may alternatively be embodied in specialized hardware. Depending on the embodiment, the non-transitory readable medium may be a hard disk drive, a compact disc, a digital video disc, a tape drive or other suitable storage medium.

Although certain disclosed embodiments of the present disclosure have been specifically described, the present disclosure is not to be construed as being limited thereto. Various changes or modifications may be made to the present disclosure without departing from the scope and spirit of the present disclosure.

What is claimed is:

1. A camera device, comprising:
an image capturing unit, a storage system, and at least one processor; and one or more programs stored in the storage system and executed by the at least one processor, the one or more programs comprising:
an image obtaining module operable to predefine a face feature value and an eyes feature value of people, store the face feature value and the eyes feature value into the storage system, and control the image capturing unit to capture a series of digital images of a group of persons;
a face detection module operable to detect one or more face areas from each of the digital images according to the face feature value, analyze an image resolution of each of the face areas, and count a number of faces in the face areas in each of the digital images;
an eyes detection module operable to detect an eyes area from each of the face areas according to the eyes feature value, analyze an image resolution of each of the eyes areas, and count a number of eyeballs in the eyes areas in each of the digital images; and
an image selection module operable to calculate a ratio of the number of faces to the number of eyeballs in each of the digital images, select target images whose ratio of the number of faces to the number of eyeballs is 1:2 from the digital images, and determine one of the target images as a non-blinking image of the group of persons; and
wherein the image selection module is further operable to determine whether a total number of the target images is more than one; and
wherein the image selection module determines the target image as the non-blinking image if a total number of the target images is equal to one, or selects one of the target images whose face area and eyes area have a highest image resolution as the non-blinking image if the total number of the target images is more than one.

2. The camera device according to claim 1, wherein the face detection module detects an image area of the digital image as the face area if a face similarity coefficient between the image area of the digital image and a predefined face sample stored in the storage system is greater than the face feature value.

3. The camera device according to claim 1, wherein the face detection module detects an image area of the digital image of the digital image as the eyes area if an eyes similarity coefficient between the image area and a predefined eyes sample stored in the storage system is greater than the eyes feature value.

4. The camera device according to claim 1, wherein the eyes detection module analyzes the color of each of the eyes areas to seek black and round objects as denoting an eyeball area, and compares the eyeball area, and compares the eyeball area with a predefined eyeball sample stored in the storage system to count the number of eyeballs in each of the eyes areas.

5. A method for capturing non-blinking images of people using a camera device, the method comprising:
(a) predefining a face feature value and an eyes feature value of people, and storing the face feature value and the eyes feature value into a storage system of the camera device;
(b) controlling an image capturing unit of the camera device to capture a series of digital images of a group of persons;
(c) detecting one or more face areas from each of the digital images according to the face feature value;
(d) analyzing an image resolution of each of the face areas, and counting a number of faces in the face areas in each of the digital images;
(e) detecting an eyes area from each of the face areas according to the eyes feature value;
(f) analyzing an image resolution of each of the eyes areas, and counting a number of eyeballs in the eyes areas in each of the digital images;
(g) calculating a ratio of the number of faces to the number of eyeballs in each of the digital images;
(h) selecting target images whose ratio of the number of faces to the number of eyeballs is 1:2 from the digital images, and determining whether a total number of target images is more than one; and
(i) outputting one of the target images as a non-blinking image of the group of persons; and wherein step (i) further comprises determining the target image as the non-blinking image if a total number of the target images is equal to one, and selecting one of the target images whose face area and eyes area have a highest image resolution as the non-blinking image if the total number of the target images is more than one.

6. The method according to claim 5, wherein the step (c) comprises:
determining whether a face similarity coefficient between an image area of the digital image and a predefined face sample stored in the storage system is greater than the face feature value; and
determining that the image area of the digital image is the face area if the face similarity coefficient is greater than the face feature value.

7. The method according to claim 5, wherein the step (e) comprises:
determining whether an eyes similarity coefficient between an image area of the digital image and a predefined eyes sample stored in the storage system is greater than the eyes feature value; and
determining that the image area of the digital image is the eyes area if the eyes similarity coefficient is greater than the eyes feature value.

8. The method according to claim 5, wherein the eyeball number is counted by steps of:
analyzing the color of each of the eyes areas to seek black and round objects as denoting an eyeball areas; and
comparing the eyeball area with a predefined eyeball sample stored in the storage system to count the number of eyeballs in each of the eyes areas.

9. A non-transitory computer-readable medium having stored thereon instructions that, when executed by at least one processor of a camera device, cause the camera device to perform a method for capturing non-blinking images of people, the method comprising:
(a) predefining a face feature value and an eyes feature value of people, and storing the face feature value and the eyes feature value into a storage system of the camera device;
(b) controlling an image capturing unit of the camera device to capture a series of digital images of a group of persons;
(c) detecting one or more face areas from each of the digital images according to the face feature value;

(d) analyzing an image resolution of each of the face areas, and counting a number of faces in the face areas in each of the digital images;

(e) detecting an eyes area from each of the face areas according to the eyes feature value;

(f) analyzing an image resolution of each of the eyes areas, and counting a number of eyeballs in the eyes areas in each of the digital images;

(g) calculating a ratio of the number of faces to the number of eyeballs in each of the digital images;

(h) selecting target images whose ratio of the number of faces to the number of eyeballs is 1:2 from the digital images, and determining whether a total number of target images is more than one; and (i) outputting one of the target images as a non-blinking image of the group of persons; and wherein step (i) further comprises determining the target image as the non-blinking image if a total number of the target images is equal to one, and selecting one of the target images whose face area and eyes area have a highest image resolution as the non-blinking image if the total number of the target images is more than one.

10. The medium according to claim 9, wherein the step (c) comprises:

determining whether a face similarity coefficient between an image area of the digital image and a predefined face sample stored in the storage system is greater than the face feature value; and determining that the image area of the digital image is the face area of the people if the face similarity coefficient is greater than the face feature value.

11. The medium according to claim 9, wherein the step (e) comprises:

determining whether an eyes similarity coefficient between an image area of the digital image and a predefined eyes sample stored in the storage system is greater than the eyes feature value; and determining that the image area of the digital image is the eyes area of the people if the eyes similarity coefficient is greater than the eyes feature value.

12. The medium according to claim 9, wherein the eyeball number is counted by steps of:

analyzing the color of each of the eyes areas to seek black and round objects as denoting an eyeball area; and comparing the eyeball area with a predefined eyeball sample stored in the storage system to count the number of eyeballs in each of the eyes areas.

13. The medium according to claim 9, wherein the medium is selected from the group consisting of a hard disk drive, a compact disc, a digital video disc, and a tape drive.

* * * * *